(12) United States Patent
Ayyappannair Radhadevi et al.

(10) Patent No.: US 11,528,179 B1
(45) Date of Patent: Dec. 13, 2022

(54) SYSTEM, APPARATUS, AND METHOD FOR IQ IMBALANCE CORRECTION FOR MULTI-CARRIER IQ TRANSMITTER

(71) Applicant: Silicon Laboratories Inc., Austin, TX (US)

(72) Inventors: Aravinth Kumar Ayyappannair Radhadevi, Tamil Nadu (IN); Sanjeev Kumar Soni, Madhya Pradesh (IN)

(73) Assignee: Silicon Laboratories Inc., Austin, TX (US)

( * ) Notice: Subject to any disclaimer, the term of this patent is extended or adjusted under 35 U.S.C. 154(b) by 0 days.

(21) Appl. No.: 17/376,349

(22) Filed: Jul. 15, 2021

(51) Int. Cl.
*H04L 27/36* (2006.01)
*H04L 27/26* (2006.01)
*H04L 27/34* (2006.01)
*H04L 27/38* (2006.01)

(52) U.S. Cl.
CPC ........ *H04L 27/364* (2013.01); *H04L 27/2666* (2013.01); *H04L 27/3411* (2013.01); *H04L 27/3863* (2013.01)

(58) Field of Classification Search
CPC ..... H04L 27/36; H04L 27/362; H04L 27/364; H04L 27/2666; H04L 27/3411; H04L 27/3863
See application file for complete search history.

(56) References Cited

U.S. PATENT DOCUMENTS

| | | | | |
|---|---|---|---|---|
| 8,514,914 | B2* | 8/2013 | Yokoo | H04L 27/26526 375/228 |
| 11,228,104 | B2* | 1/2022 | Kihira | H04B 17/14 |
| 2004/0085929 | A1* | 5/2004 | Azuma | H04B 17/12 370/535 |
| 2004/0203472 | A1* | 10/2004 | Chien | H04L 27/0014 455/67.11 |
| 2008/0165874 | A1* | 7/2008 | Steele | H04L 27/3863 375/261 |
| 2015/0119021 | A1* | 4/2015 | Song | H04W 52/0229 455/552.1 |
| 2020/0092053 | A1* | 3/2020 | Bai | H04B 17/11 |

OTHER PUBLICATIONS

Josias Jacobus De Witt; "Modelling, Estimation and Compensation of Imbalances in Quadrature Transceivers," Stellenbosch University, Mar. 2011, pp. 1-239.

* cited by examiner

Primary Examiner — Siu M Lee
(74) Attorney, Agent, or Firm — Trop, Pruner & Hu, P.C.

(57) ABSTRACT

In one embodiment, an apparatus includes a baseband circuit to generate a plurality of subcarriers of a complex sample of a message to be transmitted, and a compensation circuit coupled to the baseband circuit, the compensation circuit to compensate for IQ mismatch. The compensation circuit may include: a calibration circuit to determine, using a tone signal, gain correction values and phase correction values for a subset of the plurality of subcarriers; and a correction circuit to apply the gain correction values and the phase correction values to the plurality of subcarriers to compensate for the IQ mismatch.

18 Claims, 7 Drawing Sheets

SYSTEM, APPARATUS, AND METHOD FOR IQ IMBALANCE CORRECTION FOR MULTI-CARRIER IQ TRANSMITTER

BACKGROUND

In an IQ transmitter system, any small mismatch between I and Q paths leads to generation of a signal at an undesired frequency (image) at the transmitter output. In a wide band system, this imbalance varies over frequency. This frequency dependent IQ imbalance is a potential issue in a multi-carrier IQ transmitter, such as used for orthogonal frequency division multiplexing (OFDM), which degrades performance. Correcting the IQ imbalance at one frequency may degrade the image power at other frequencies.

In a multi-carrier system, correcting each subcarrier frequency increases the complexity of calibration and correction by multi-fold (depending on the number of subcarriers). Single frequency point calibration and correction is simpler, but the improvement in image suppression is only around the calibrated frequency, and may not adequately compensate for deleterious effects.

SUMMARY OF THE INVENTION

In one aspect, an apparatus includes a baseband circuit to generate a plurality of subcarriers of a complex sample of a message to be transmitted, and a compensation circuit coupled to the baseband circuit, the compensation circuit to compensate for IQ mismatch. The compensation circuit may include: a calibration circuit to determine, using a tone signal, gain correction values and phase correction values for a subset of the plurality of subcarriers; and a correction circuit to apply the gain correction values and the phase correction values to the plurality of subcarriers to compensate for the IQ mismatch. The apparatus may further include a converter to convert the compensated plurality of subcarriers to analog form, a mixer coupled to the converter to convert the compensated plurality of subcarriers in the analog form to a radio frequency (RF) signal, and a power amplifier to amplify and output the RF signal.

In one example, the apparatus further comprises a power detector coupled to the power amplifier, where the power detector is to determine a carrier power and an image power of the RF signal. The calibration circuit may receive a digital measure of at least the image power and determine the gain correction values and the phase correction values based at least in part on the digital measure. The calibration circuit may further determine the gain correction values and the phase correction values for the subset comprising positive subcarriers of the plurality of subcarriers. The calibration circuit also may determine another gain correction value and another phase correction value for a negative subcarrier of the plurality of subcarriers. In an example, the calibration circuit is to determine an offset in a phase of a mixing signal input to the mixer based at least in part on a first phase correction value for a positive subcarrier (m) and a second phase correction value for a negative subcarrier (–m).

In an example, the apparatus further comprises a non-volatile storage to store the gain correction values and the phase correction values. The plurality of subcarriers may be 2N subcarriers, and the calibration circuit is to determine the gain correction values and the phase correction values for N or fewer of the 2N subcarriers. In an example, the calibration circuit is to determine the gain correction values and the phase correction values for N/x subcarriers, and the correction circuit is to use a single gain correction value and a single phase correction value for a group of x subcarriers, where x is a positive integer.

In an example, the compensation circuit is to: generate, for a first one of the subset of the plurality of subcarriers, a tone frequency; determine, for the first one of the subset of the plurality of subcarriers, an image power of the transmitter for each of a plurality of candidate gain correction values and phase correction values; identify, for the first one of the subset of the plurality of subcarriers, an optimum pair of the plurality of candidate gain correction values and phase correction values; and store the optimum pair in a non-volatile memory in association with the first one of the subset of the plurality of subcarriers.

In another aspect, a method includes: performing, via a compensation circuit of a transmitter, a calibration of the transmitter to determine, for each of a plurality of subcarriers of a first polarity, first correction values; using the first correction values to determine second correction values for each of a plurality of subcarriers of a second polarity; and storing the first correction values and the second correction values in a storage of the transmitter.

In an example, the plurality of subcarriers of the first polarity comprises N or fewer subcarriers for a modulation scheme having 2N subcarriers. The method may further include: receiving data in the compensation circuit; and compensating the data for mismatch of the transmitter using the first correction values and the second correction values. The method may also include: transforming the compensated data to time domain data; converting the time domain data to a RF signal; and transmitting the RF signal from the transmitter.

In an example, performing the calibration comprises, for a first subcarrier of the plurality of subcarriers of the first polarity: generating a tone frequency; processing the tone frequency with each of a plurality of candidate gain correction values and phase correction values; determining an image power of the transmitter for the tone frequency processed with each of the plurality of candidate gain correction values and phase correction values; identifying an optimum pair of the plurality of candidate gain correction values and phase correction values based at least in part on the image power; and associating the optimum pair with the first subcarrier. In addition, the optimum pair may be stored in a first entry of the storage. The method may further include: for a first subcarrier of a baseband signal, accessing the optimum pair from the first entry of the storage; compensating the first subcarrier of the baseband signal using the optimum pair; and providing the compensated first subcarrier of the baseband signal to a frequency-to-time converter to convert the compensated first subcarrier of the baseband signal to a time domain signal.

In yet another aspect, a system includes a transceiver having a receiver and a transmitter, where the transmitter comprises a complex signal processing path comprising an in-phase (I) portion and a quadrature phase (Q) portion. The transmitter may include: a baseband circuit to generate at least a first subcarrier and a second subcarrier of a message sample; and compensation circuit coupled to the baseband circuit, the compensation circuit to compensate for IQ mismatch. The compensation circuit may include: a calibration circuit to determine a first gain correction value and a first phase correction value for a tone frequency associated with the first subcarrier; and a correction circuit to apply the first gain correction value and the first phase correction value to the first subcarrier, and apply another gain correction value and another phase correction value to the second subcarrier, the another gain correction value obtained using the first gain correction value and the another phase correction value obtained using the first phase correction value.

The system may further include a converter to convert the compensated first and second subcarriers to analog form, a mixer coupled to the converter to convert the compensated first and second subcarriers in the analog form to a RF signal, and a power amplifier to amplify and output the RF signal.

In an example, the correction circuit is to apply the first gain correction value and the first phase correction value to a first plurality of subcarriers, the transmitter comprising a multi-carrier IQ transmitter. The system may further include a non-volatile memory to store the first gain correction value and the first phase correction value.

DETAILED DESCRIPTION

In various embodiments, techniques are provided to reduce the effect of variation in IQ imbalance across subcarrier frequencies and suppress image power at 2 (2N) symmetrically located frequency points (simultaneously) about DC. Embodiments may be generalized to "N" point calibrations for suppressing images at "2N" subcarriers. In the presence of local oscillator (LO) mismatch, calibration at one extra frequency point may occur, resulting in "N+1" calibrations for correction at "2N" subcarriers. Before discussing details of this calibration, reference to a representative transmitter that incorporates an embodiment is set forth.

Figure 1:
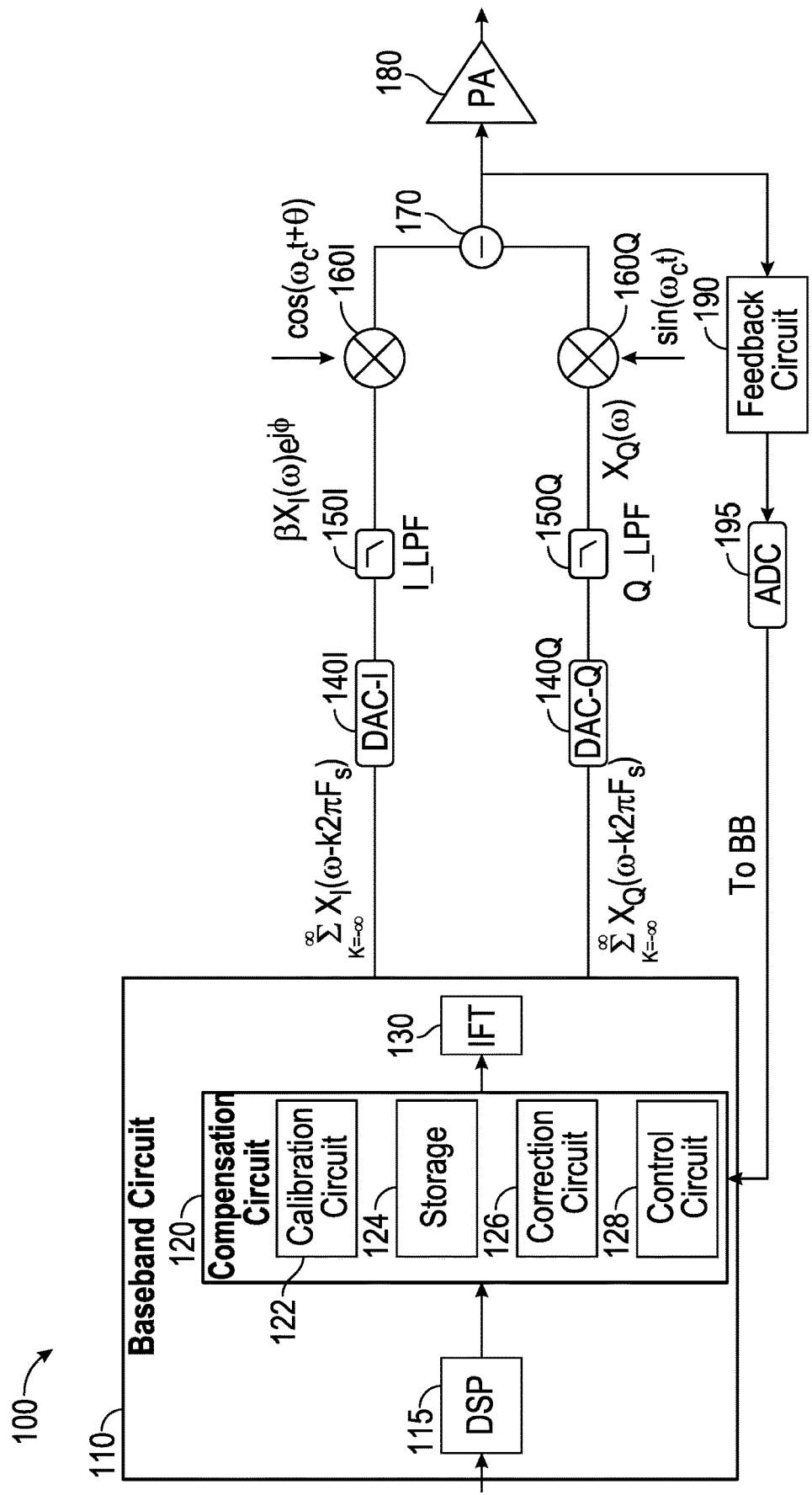
FIG. 1 is a block diagram of a transmitter in accordance with an embodiment.

Referring now to FIG. 1, shown is a block diagram of a transmitter in accordance with an embodiment. In the embodiment shown in FIG. 1, transmitter 100 is a wireless transmitter that may be used in a wide variety of devices, such as small portable devices, e.g., smartphones or Internet of Things (IoT) devices, among others. As shown, transmitter 100 has a complex architecture with separate processing paths for in-phase (I) signals and quadrature phase (Q) signals. Because of the difficulties in realizing perfect matching in the components of these different signal processing paths, there may be some amount of IQ imbalance in signals as they pass through the transmit signal processing path and are transmitted from transmitter 100.

With embodiments herein, a measure of this IQ imbalance may be determined and signals to be transmitted can be compensated to substantially reduce if not completely remove such mismatch. Understand while FIG. 1 shows a high level implementation of a transmitter, variations and alternatives are possible, and of course additional components may be present within the transmitter. Furthermore, while only a transmitter is shown in FIG. 1, understand that in some implementations, transmitter 100 may be included as part of a transceiver along with receiver components, at least some of which may be shared.

In the embodiment of FIG. 1, incoming signals, which may be received from source circuitry of a device such as various processing circuitry, sensor circuitry or so forth, may be received in a baseband circuit 110. Understand that certain preparatory processing may be performed on the incoming signals prior to receipt within baseband circuit 110. In any case, as seen, the incoming signals are provided to a digital signal processor 115, which receives incoming time domain signals and performs signal processing, e.g., filtering, digital modulation, and so forth. In one representative use case, communication may be according to an OFDM modulation scheme in which samples may be transformed into N subcarriers (where N may be 64 or 256 as several examples), in an embodiment.

As described above, due to possible mismatches in the I and Q signal processing paths, the signals communicated via these paths may suffer from some amount of distortion. Accordingly, a compensation circuit 120 is present. In some cases, compensation circuit 120 may be included in baseband circuit 110 or it can be a different component. In embodiments herein, compensation circuit 120 may be configured to determine a level of mismatch and provide compensation for such mismatch in a minimally complex manner. More specifically, compensation circuit 120 may be configured to perform a limited amount of calibration to enable suppression of IQ imbalance, across all subcarriers.

As illustrated, compensation circuit 120 includes a calibration circuit 122. In embodiments herein, calibration circuit 122 may be configured to perform a calibration for a limited number of frequency points (e.g., subcarriers). After such calibration, correction values that are determined can be leveraged to determine additional correction values for subcarriers that were not calibrated. Note that the calibration operations performed in calibration circuit 122 may be performed a single time, with the resulting correction values stored in a calibration storage 124. In certain implementations, the calibration is done during manufacture and stored in storage 124, which may be a non-volatile memory.

Still with reference to compensation circuit 120, also included is a correction circuit 126. In embodiments herein, correction circuit 126 may receive complex amplitudes of incoming "2N" subcarriers and correct them for IQ imbalance using the correction values. As such, IQ imbalances may be corrected and the resulting imbalance-corrected complex amplitudes for "2N" subcarriers are next sent to an inverse Fourier transform (IFT) engine 130, where the frequency domain information can be transformed back to the time domain. Also shown is a control circuit 128, which may control operation of compensation circuit 120, both for performing a calibration to determine correction values and for compensating for IQ mismatch during transmitter operation.

The resulting time domain signals may then be sent for further signal processing. Specifically as shown in the high level of FIG. 1, the IQ signals may be sent to a digital-to-analog converter (DAC) $140_{I,Q}$ for conversion to analog signals. The resulting analog signals are then filtered in corresponding low pass filters (LPFs) $150_{I,Q}$. In turn, these filtered signals are converted to radio frequency (RF) via corresponding complex mixers $160_{I,Q}$, which mix the incoming signals with mixing signals received from a local oscillator (not shown for ease of illustration in FIG. 1). Note in FIG. 1, the effects of mismatch are represented in the signals that pass through the I and Q paths.

Still referring to FIG. 1, the RF signals of the two paths may then be combined in a combiner 170. In an embodiment, combiner 170 may subtract the quadrature phase portion from the in-phase portion to generate an RF signal for output. In some implementation combiner 170 and mixers 160 can be incorporated in a single block. The RF signal may be provided to a power amplifier 180 for amplification. Note that in some cases a pre-driver may be present between combiner 170 and PA 180 (or such pre-driver may be included within power amplifier 180 in other cases).

Still referring to FIG. 1, a feedback path exists such that the RF signals are provided to a feedback circuit 190. In the embodiments herein, feedback circuit 190 may be configured to measure image and carrier power and provide such information (after digitization in an analog-to-digital converter (ADC) 195) back to baseband circuit 110. This information may be used at least in part by compensation circuit 120 in determining appropriate correction values, as will be described further herein. Understand while shown at this high level in the embodiment of FIG. 1, many variations and alternatives are possible.

To understand the compensation techniques described herein, it is instructive to consider baseband generation of OFDM signals. In an example, the samples of "I" [$x_I(n)$] and "Q" [$x_Q(n)$] path signals used for generating passband OFDM signals have "2N" subcarriers equally spaced by a given frequency (fi Hertz (Hz)). These signals, as generated in a digital baseband circuit (e.g., baseband circuit 110), are given by:

$$x(n) = x_I(n) + jx_Q(n) = \sum_{k=-N}^{N} X(k)e^{j*k*\frac{2\pi}{2N}n} = \sum_{k=-N}^{N} X(k)e^{j*k*\omega_o n}, \quad \text{Equation (1)}$$

$$k \neq 0$$

$x(n)$ is sample of analog OFDM signal at $t = nT_s$ $$f_1 = \frac{\omega_o}{2\pi} * F_s, \, F_s = \frac{1}{T_s}, \, T_s \rightarrow \text{Sampling time}$$

$X(k) \rightarrow$ Complex amplitude for $k^{th}$ subcarrier storing amplitude and phase information Due to circuitry mismatches in the different signal processing paths, some amount of IQ imbalance may exist. Embodiments may be used to efficiently and at reduced compute complexity determine a level of IQ imbalance and correct the same. As will be discussed, there are different techniques that may be used in different implementations.

In one implementation, a frequency domain correction may be performed at 2N frequencies (or frequency groups). Assume that $x_I(n)$ and $x_Q(n)$ for a "$k^{th}$" subcarrier [$x_i^k(n)$ and $x_a^k(n)$ respectively] are generated separately in the digital baseband circuit, as below (from Equation 1):

$x_I^k(n) = |X(k)|*\cos(k\omega_o n + \phi_{X_k})$, $x_Q^k(n) = |X(k)|*\sin(k\omega_o n + \phi_{X_k})$.

Then a certain amount of phase offset "φ" in $x_Q(n)$ may be introduced in the digital baseband circuit, with each $x_Q^k(n)$ having a different phase offset of "$\varphi_k$". Similarly, a certain amount of gain imbalance "α" can be introduced in the digital baseband circuit, with each $x_Q^k(n)$ having a different gain imbalance of "$\alpha_k$". In this example, IQ imbalance can be corrected by introducing a phase shift ($\varphi_k$) and a gain imbalance ($\alpha_k$) in X(k) for only the $x_Q^k(n)$ signals.

This transformation results in the following signals $x_I^k(n)$ and $x_Q^k(n)$ generated in the digital baseband circuit.

$x_I^k(n) = |X(k)|*\cos(k\omega_o n + \phi_{X_k})$, $x_Q^k(n) = \alpha_k|X(k)|*\sin(k\omega_o n + \phi_{X_k} + \varphi_k)$.

The resulting signals with the introduced imbalances in the Q-path signal are passed to additional signal path processing circuitry, including filter circuitry, namely an I/O low pass filter (LPF). Assume that there is mismatch in the filters of the different paths, with the I path LPF having a phase imbalance of $\phi_{lpf\_k}$ and a gain imbalance of $\beta_k$ (at a frequency of $k(\omega_o/2\pi) F_s$ Hz) with respect to the Q path LPF. In this situation, the analog I and Q signals for "$k^{th}$" subcarrier are:

$x_I^k = \beta_k|X(k)|*\cos(\omega_k t + \phi_{X_k} + \phi_{lpf\_k})$ $x_Q^k = \alpha_k|X(k)|*\sin(\omega_k t + \phi_{X_k} + \varphi_k)$ $\omega_k = k\omega_o F_s$ Upon multiplying $x_I^k(t)$ and $x_Q^k(t)$ with quadrature LO signals having a phase mismatch of "θ," the resulting RF signal ($x_{RF}$), corresponding to the "$k^{th}$" subcarrier is:

$$x_{RF} = x_{RF\_I} - x_{RF\_Q}$$

$$x_{RF\_I} = \beta_k|X(k)| * \cos(w_k t + \phi_{X_k} + \phi_{lpf\_k}) * \cos(w_c t + \theta), (\beta_k = \beta_{-k})$$

$$x_{RF\_Q} = \alpha_k|X(k)| * \sin(k\omega_o n + \phi_{X_k} + \varphi_k) * \sin(w_c t)$$

$\phi_{lpf\_k}$ and $\beta_k$ are phase and gain imbalance of "Q" path with respect to "I" path for "$k^{th}$" sub-carrier $$x_A = \cos(w_c t + \omega_k t + \theta + \phi_{X_k} + \phi_{lpf_k}) + \cos(w_c t - \omega_k t - \theta - \phi_{X_k} - \phi_{lpf_k})$$

$$x_{RF\_I} = \frac{\beta_k|X(k)|}{2} x_A$$

$$x_B = \cos(w_c t - \omega_k t - \phi_{X_k} - \phi_k) - \cos(w_c + \omega_k t + \phi_{X_k} + \varphi_k)$$

$$x_{RF\_Q} = \frac{\alpha_k|X(k)|}{2} x_B$$

Amplitude mismatch of I and Q LO path can be accounted within $\beta_k$.

From above Equations, it can be seen that for cancelling the image for "+ve" and "−ve" side subcarriers, the phase ($\varphi_k$) and gain correction ($\beta_k$) in the digital baseband circuit may be controlled to be:

$$\varphi_k = \begin{matrix} \phi_{lpf_k} - \theta & k > 0 \\ -\phi_{lpf_k} - \theta & k < 0 \\ \alpha_k = \beta_k \end{matrix}, \quad \text{Equation 2}$$

Therefore by having "2N+1" parameters (θ, $\phi_{lpf\_k}$ and $\beta_k$, k∈[1 N]), the image for all "2N" subcarriers can be suppressed using the above described technique, which uses a modification in the input to the IFT engine used for generating OFDM signals in the digital baseband circuit.

In embodiments, the above-described technique can be used to suppress image for "2N" subcarriers by using an N-point calibration when θ equals zero, and instead using an N+1 point calibration when θ does not equal zero. Note that when θ equals zero, the phase correction for +ve subcarriers (k>0) is a negative of the phase correction for −ve subcarriers (k<0). As such, calibration may be performed for only on "+ve" or only "−ve" subcarriers, which is sufficient to correct all "2N" subcarriers (−N≤k≤N, k≠0).

Instead when θ does not equal zero, the value of "θ" is to be identified. In an embodiment, this can be done by finding a phase correction for all "+ve" subcarriers (k>0) and one more subcarrier for any k<0. For example with an extra calibration done for k=-1, Equation 2 can be used for k=1 and k=-1 to solve for δ (also for $\phi_{lpf}$ for k=1).

With the considerations above, if the LO phase mismatch is null, the calibrated phase imbalance is applied for the calibrated frequency point, and the negative of this value is applied for the frequency point symmetric to the calibrated frequency about DC.

As an example (when LO phase mismatch is null), if a calibration is done at a 5 MHz tone and the phase imbalance is 0.6 degrees, a 0.6 degree correction is applied to 5 MHz and a −0.6 degree correction is applied to −5 MHz.

In a case where a fixed phase imbalance (due to LO mismatch or other means) is not null, its correction value is added to both frequency points in the same fashion. For example, if "θ" is the fixed phase correction and "φ" is a phase correction, without LO mismatch, for a particular frequency point (say fc) then a phase correction of "−θ+φ" is applied at frequency "fc" and a "−θ−φ" correction is applied at "−fc" frequency. The gain imbalance calibrated at the frequency "fc" is applied to both frequencies, i.e., "fc" and "−fc" in the same fashion.

To reduce complexity in calibration and correction in a multicarrier system, calibration may be done at a minimum of one frequency point for a case of no mismatch in LO and two points for a case with LO mismatch and the obtained calibrated phase ($\phi_k$) and gain imbalance ($\delta_k$) correction can be applied to all frequencies that are on the same side (sign) of the calibrated frequency, and calculated phase and gain correction value, from Equation 2, is applied at all negated frequencies. Similarly, frequencies can be grouped, and a given number of calibration points can be chosen accordingly. For example to reduce calibration complexity, gain and phase correction values can be determined for N/2, N/4 or another smaller number of subcarriers (where N is a positive integer). Then the determined correction values can be used for a group of subcarriers around a given subcarrier for which correction values are determined.

Thus with the presented embodiment, IQ imbalance can be calibrated at "N" frequency points, where "2N" is the number of frequency points planned for correction. In this case, the LO phase imbalance (or a fixed imbalance) is assumed to be null or it is already corrected by some means. If LO imbalance is not null, an additional calibration may be performed.

Figure 2:
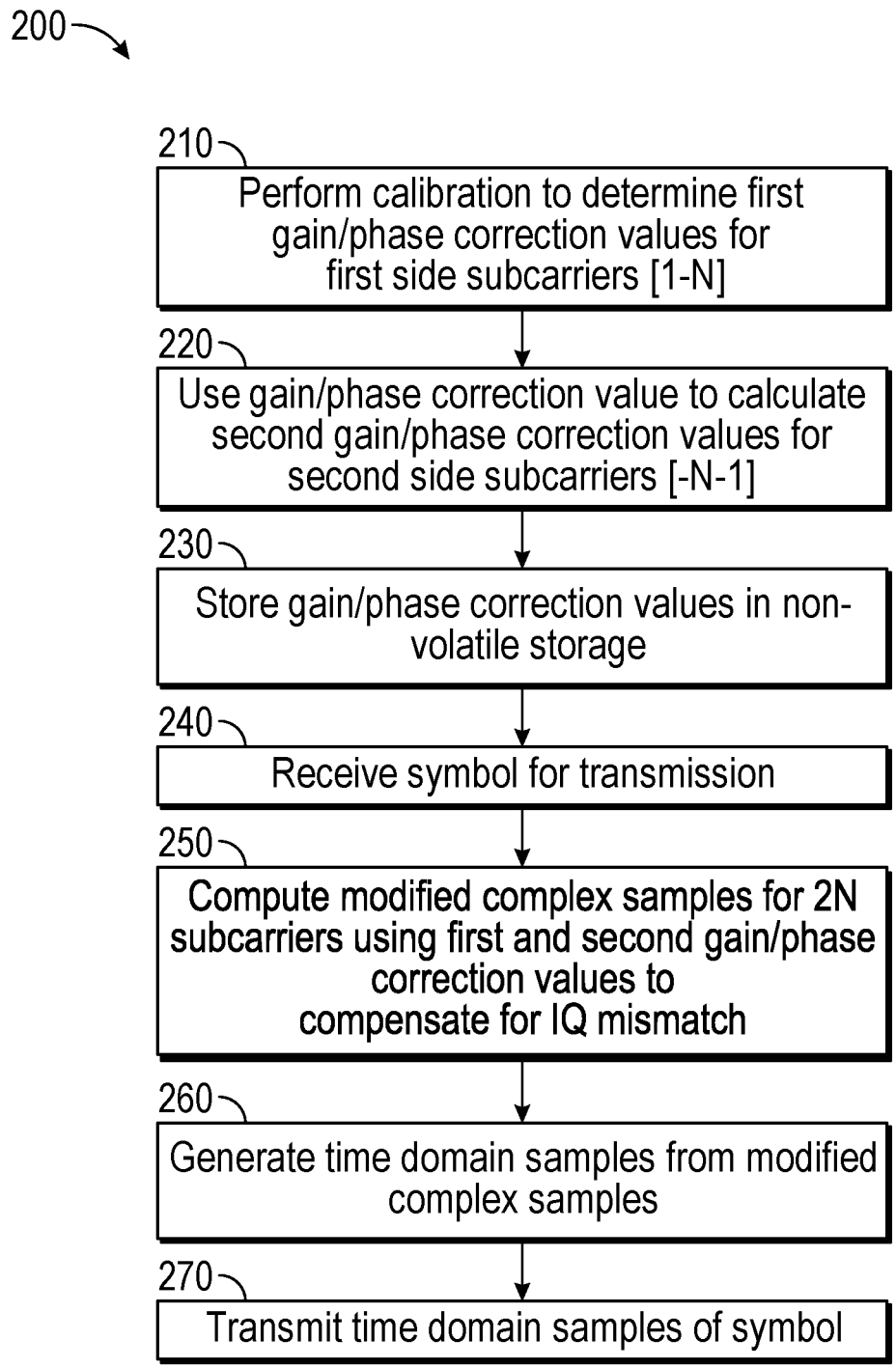
FIG. 2 is a flow diagram of a method in accordance with an embodiment.

Referring now to FIG. 2, shown is a flow diagram of a method in accordance with an embodiment. More specifically, method 200 is an overall method describing both a one time factory calibration and configuration of a transmitter with correction values and use of these correction values during normal operation to compensate for IQ mismatch. As such, method 200 overall may be performed in different steps, including first portions that are performed, e.g., one time at manufacture of the transmitter, when the transmitter is first implemented into an end device, or when the transmitter is placed into field service. In turn, other portions may be performed during normal operation in the field. In any event, method 200 is performed by hardware circuitry, alone or in combination with firmware and/or software.

As shown, method 200 begins at block 210, where the calibration may be performed to determine first gain/phase correction values for a first side's subcarriers. Assume in this example that a factory calibration occurs. This calibration may be performed in an efficient manner using an embodiment in which less than all subcarriers may be analyzed.

To perform the calibration, a test tone may be generated for the given subcarrier, which is then allowed to proceed through the different I and Q signal paths, resulting in information that is used to generate the first gain/phase correction values, namely, one gain correction value and one phase correction value for each of a selected number of subcarriers (e.g., from 1 to N). Then at block 220, these first gain/phase correction values may be used to calculate second gain/phase correction values for the second side's subcarriers. As described herein, in general these values may be determined using Equation 2.

Still referring to FIG. 2, next at block 230 the first and second gain/phase correction values may be stored in a non-volatile storage. This non-volatile storage may be included within the transmitter itself. Or in another case, the values may be stored in a table, e.g., as part of a firmware for the device. In any case, at this point the calibration is completed and the transmitter is ready for normal operation.

Still referring to FIG. 2, next at block 240 during normal operation a set of "2N" symbols may be received within the transmitter for transmission. In addition to conventional signal processing, at block 250 modified "2N" symbols, in form of "2N" complex amplitudes, may be computed for the 2N subcarriers. More specifically, the first and second gain/phase correction values may be used to compensate for IQ mismatch. Details of this compensation may occur as described above and as further detailed below. Then at block 260 time domain samples may be generated from these modified complex amplitudes. Finally, at block 270 the time domain samples of the symbol may be transmitted via a power amplifier. Understand while shown at this high level in FIG. 2, many variations and alternatives are possible.

Figure 3:
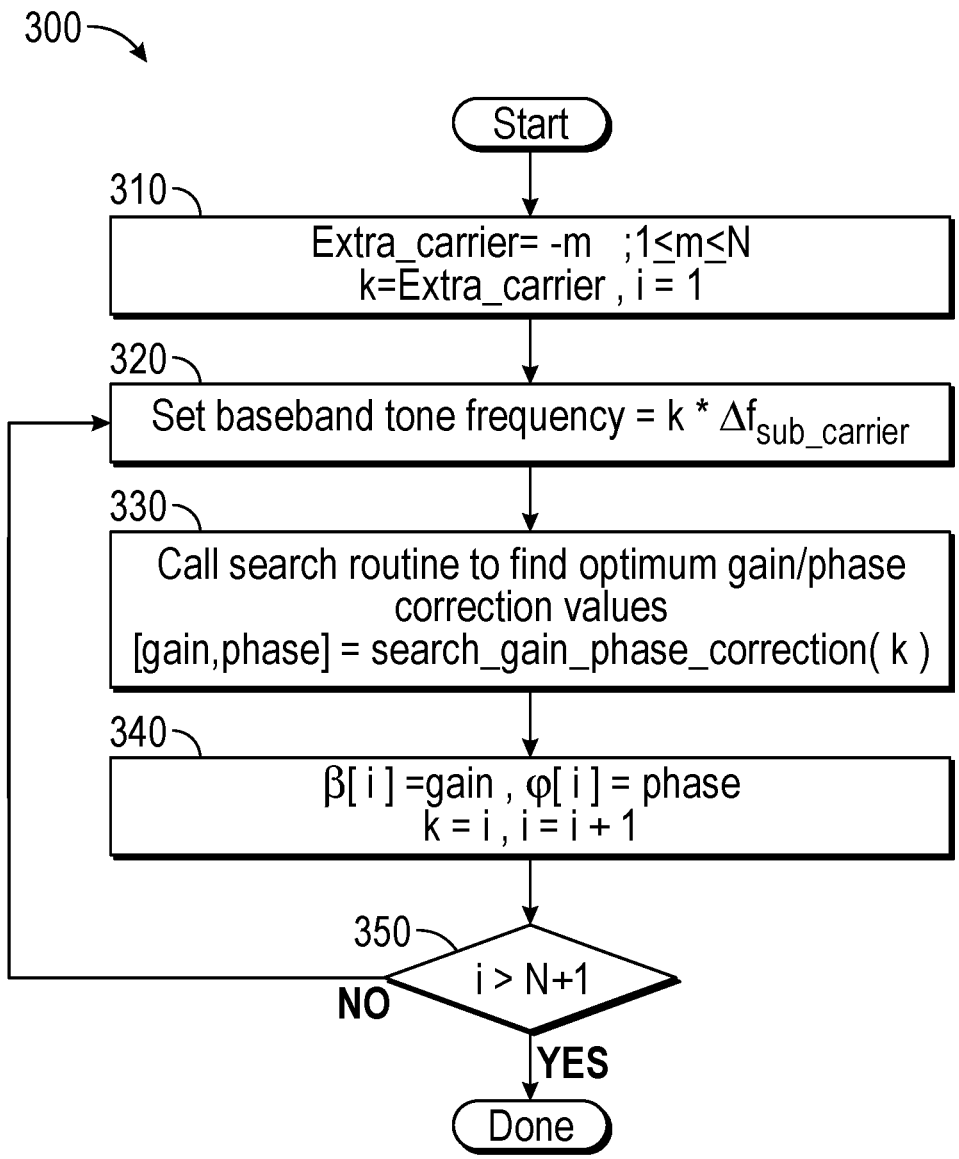
FIG. 3 is a flow diagram of a method in accordance with another embodiment.

Referring now to FIG. 3, shown is a flow diagram of a method in accordance with another embodiment. More specifically, method 300 is a method for determining gain/phase correction values for a first side's subcarriers. In different implementations, method 300 may be performed in a factory setting or other location and can be performed by any hardware circuitry such as a given computing device, including an end user device that includes a transmitter as described herein. As illustrated, method 300 begins by first setting up variables (block 310), including providing for an extra carrier (−m) such that gain/phase correction values may be determined for a total of N+1 subcarriers. Note that this extra carrier may be a random one of the available negative subcarriers. Control next passes to block 320 where, for a given iteration (e.g., namely a given subcarrier), a baseband tone frequency may be set (which as shown may be set equal to $kX\Delta f_{subcarrier}$).

Still with reference to FIG. 3, next at block 330 a search routine may be called. More specifically, the search routine may be used to find an optimum gain/phase correction value pair for the given subcarrier. To this end, there may be a set of candidate gain/phase correction values. The baseband tone frequency may be passed through the signal paths, and may be compensated with these candidate correction values, to determine at which one of these correction value pairs, power at an image frequency is minimized. Thus the result of block 330 is an optimum gain/phase correction value pair for the particular subcarrier. Accordingly at block 340, these correction values may be set, namely β (gain) and φ (phase), and the variables are incremented for a next subcarrier. Next it is determined whether there are more subcarriers to be considered (diamond 350). If so, control passes back to block 320. Otherwise, method 300 may conclude with the set of optimal gain/phase correction values for a given side's subcarriers.

Figure 4:
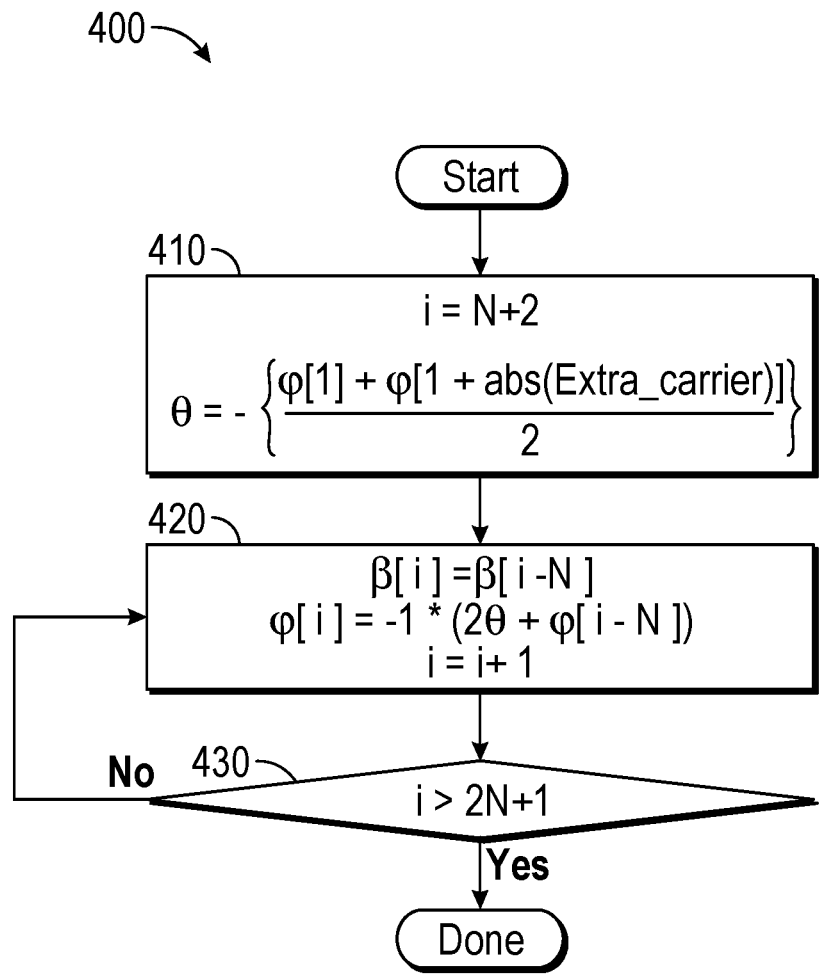
FIG. 4 is a flow diagram of a method in accordance with yet another embodiment.

Referring now to FIG. 4, shown is a flow diagram of a method in accordance with yet another embodiment. More specifically, method 400 is a method for determining gain/phase correction values for a second side's subcarriers. As shown, method 400 begins by initializing a variable (i) and determining a level of phase mismatch (θ) with regard to LO circuitry. As seen, this phase mismatch can be determined using the phase correction value of the $m^{th}$ subcarrier ($\varphi[1+$abs(Extra_carrier)]$) and the extra $-m^{th}$ (negative) subcarrier ($\varphi[1]$) determined as discussed above. Then at block 420 gain and phase values for the second side's subcarriers may be determined as shown. Then it is determined whether there are more subcarriers to be considered (diamond 430). If so, control passes back to block 420. Otherwise, method 400 may conclude with the set of optimal gain/phase correction values for a second side's subcarriers.

Figure 5:
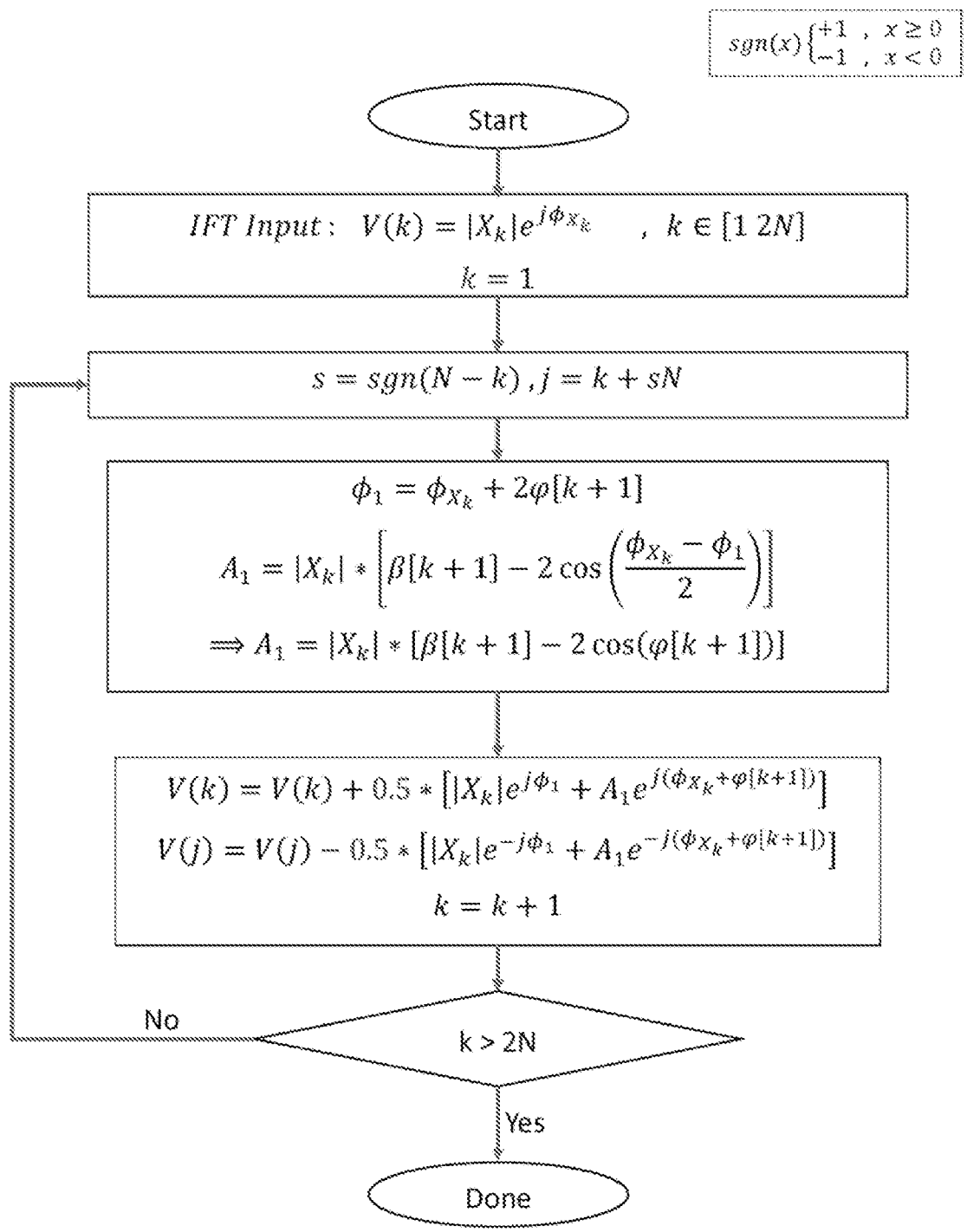
FIG. 5 is a flow diagram of a method in accordance with yet another embodiment.

Referring now to FIG. 5, shown is a flow diagram of a method in accordance with yet another embodiment. In FIG. 5, method 500 is used to generate modified or compensated complex amplitude values for the different subcarriers that may be used as an input to a transformation engine (IFT) that transforms frequency domain information back to time domain information. As such, method 500 may be performed by hardware circuitry, such as present in a compensation circuit such as described above in FIG. 1.

As illustrated, method 500 begins by obtaining an unmodified complex amplitude signal for a set of "2N" subcarriers (block 510). Next at block 520, various initialization values may be set. At block 530, intermediate variables are generated, using gain and phase correction values, to be used at block 540. Next at block 540, the various operations shown are performed to generate the modified compensated inputs to the transformation engine (e.g., an IFT engine). Next it is determined whether there are additional subcarriers to be processed (diamond 550) and if so, control passes back to block 520 discussed above. Understand that while shown at this high level in FIG. 5, many variations and alternatives are possible.

Figure 6:
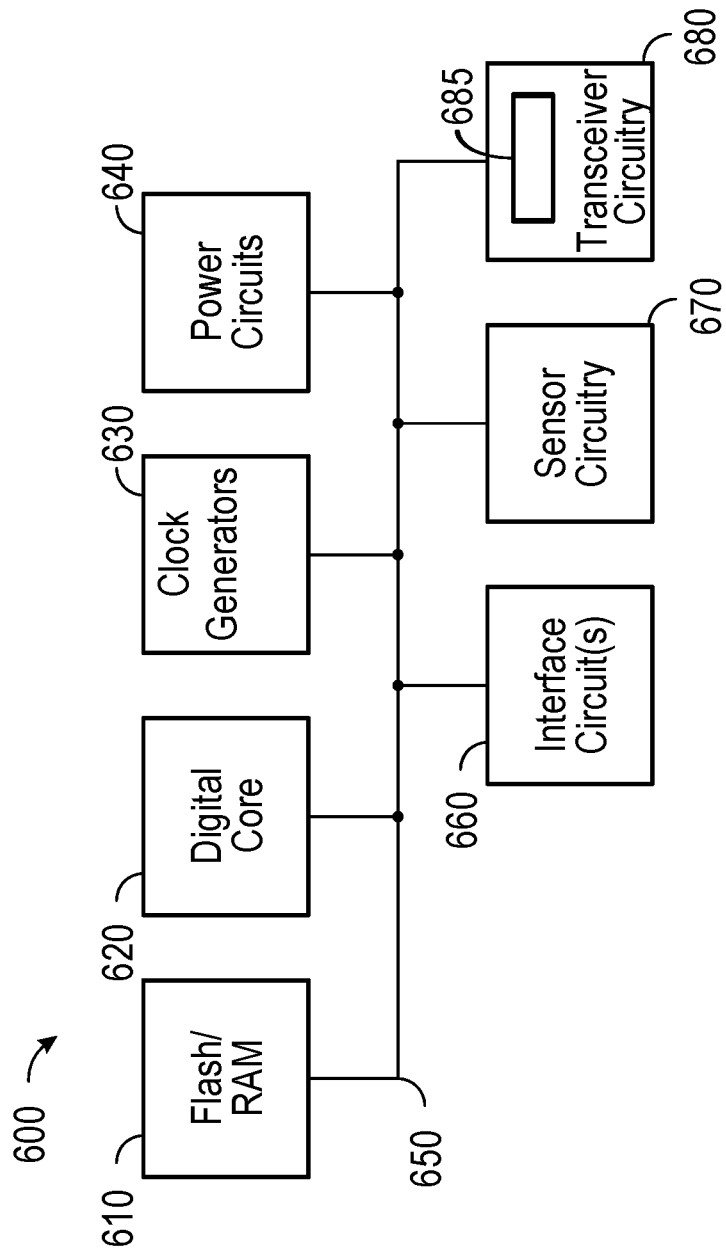
FIG. 6 is a block diagram of a representative integrated circuit that incorporates an embodiment.

Referring now to FIG. 6, shown is a block diagram of a representative integrated circuit 600 that includes compensation circuitry as described herein. In the embodiment shown in FIG. 6, integrated circuit 600 may be, e.g., a microcontroller, wireless transceiver that may operate according to one or more wireless protocols (e.g., WLAN-OFDM, WLAN-DSSS, Bluetooth, among others), or other device that can be used in a variety of use cases, including sensing, metering, monitoring, embedded applications, communications, applications and so forth, and which may be particularly adapted for use in an IoT device.

In the embodiment shown, integrated circuit 600 includes a memory system 610 which in an embodiment may include a non-volatile memory such as a flash memory and volatile storage, such as RAM. In an embodiment, this non-volatile memory may be implemented as a non-transitory storage medium that can store instructions and data. Such non-volatile memory may store instructions, including instructions for determining IQ mismatch and compensating for the same, as described herein.

Memory system 610 couples via a bus 650 to a digital core 620, which may include one or more cores and/or microcontrollers that act as a main processing unit of the integrated circuit. In turn, digital core 620 may couple to clock generators 630 which may provide one or more phase locked loops or other clock generator circuitry to generate various clocks for use by circuitry of the IC.

As further illustrated, IC 600 further includes power circuitry 660, which may include one or more voltage regulators. Additional circuitry may optionally be present depending on particular implementation to provide various functionality and interaction with external devices. Such circuitry may include interface circuitry 660 which may provide interface with various off-chip devices, sensor circuitry 670 which may include various on-chip sensors including digital and analog sensors to sense desired signals, such as for a metering application or so forth.

In addition as shown in FIG. 6, transceiver circuitry 680 may be provided to enable transmission and receipt of wireless signals, e.g., according to one or more of a local area or wide area wireless communication scheme, such as Zigbee, Bluetooth, IEEE 802.11, IEEE 802.15.4, cellular communication or so forth. As shown, transceiver circuitry 680 includes a baseband circuit 685 that can perform minimal calibration operations to determine gain and phase correction values and apply these correction values to modify at least some subcarriers to compensate for IQ mismatch as described herein. Understand while shown with this high level view, many variations and alternatives are possible.

Note that ICs such as described herein may be implemented in a variety of different devices such as an IoT device. This IoT device may be, as two examples, a smart bulb of a home or industrial automation network or a smart utility meter for use in a smart utility network, e.g., a mesh network in which communication is according to an IEEE 802.15.4 specification or other such wireless protocol.

Figure 7:
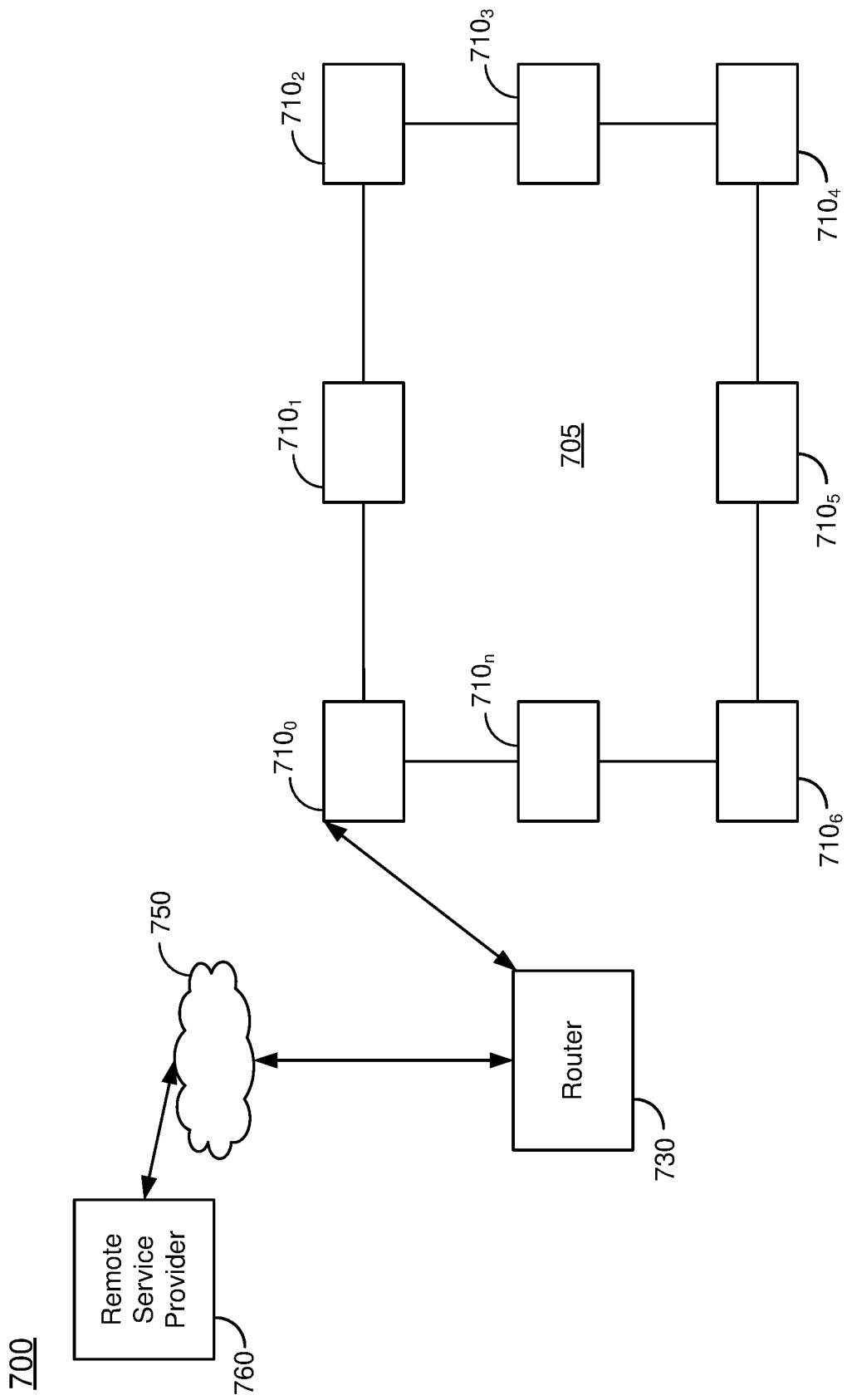
FIG. 7 is a high level diagram of a network in accordance with an embodiment.

Referring now to FIG. 7, shown is a high level diagram of a network in accordance with an embodiment. As shown in FIG. 7, a network 700 includes a variety of devices, including smart devices such as IoT devices, routers and remote service providers. In the embodiment of FIG. 7, a mesh network 705 may be present, e.g., in a building having multiple IoT devices 7100-$n$. Such IoT devices may perform IQ mismatch detection and correction as described herein. As shown, at least one IoT device 710 couples to a router 730 that in turn communicates with a remote service provider 760 via a wide area network 750, e.g., the internet. In an embodiment, remote service provider 760 may be a backend server of a utility that handles communication with IoT devices 710. Understand while shown at this high level in the embodiment of FIG. 7, many variations and alternatives are possible.

While the present disclosure has been described with respect to a limited number of implementations, those skilled in the art, having the benefit of this disclosure, will appreciate numerous modifications and variations therefrom. It is intended that the appended claims cover all such modifications and variations.

What is claimed is:

1. An apparatus comprising:
  a baseband circuit to generate a plurality of subcarriers of a complex sample of a message to be transmitted;
  a compensation circuit coupled to the baseband circuit, the compensation circuit to compensate for IQ mismatch, wherein the compensation circuit comprises:
    a calibration circuit to determine, using a tone signal, gain correction values and phase correction values for a subset of the plurality of subcarriers; and
    a correction circuit to apply the gain correction values and the phase correction values to the plurality of subcarriers to compensate for the IQ mismatch;

a converter to convert the compensated plurality of subcarriers to analog form;
a mixer coupled to the converter to convert the compensated plurality of subcarriers in the analog form to a radio frequency (RF) signal;
a power amplifier to amplify and output the RF signal; and
a power detector coupled to the power amplifier, wherein the power detector is to determine a carrier power and an image power of the RF signal.

2. The apparatus of claim 1, wherein the calibration circuit is to receive a digital measure of at least the image power and determine the gain correction values and the phase correction values based at least in part on the digital measure.

3. The apparatus of claim 1, wherein the calibration circuit is to determine the gain correction values and the phase correction values for the subset comprising positive subcarriers of the plurality of subcarriers.

4. The apparatus of claim 3, wherein the calibration circuit is to determine another gain correction value and another phase correction value for a negative subcarrier of the plurality of subcarriers.

5. The apparatus of claim 4, wherein the calibration circuit is to determine an offset in a phase of a mixing signal input to the mixer based at least in part on a first phase correction value for a positive subcarrier (m) and a second phase correction value for a negative subcarrier (−m).

6. The apparatus of claim 1, further comprising a non-volatile storage to store the gain correction values and the phase correction values.

7. The apparatus of claim 1, wherein the plurality of subcarriers comprises 2N subcarriers, and the calibration circuit is to determine the gain correction values and the phase correction values for N or fewer of the 2N subcarriers.

8. The apparatus of claim 7, wherein:
the calibration circuit is to determine the gain correction values and the phase correction values for N/x subcarriers; and
the correction circuit is to use a single gain correction value and a single phase correction value for a group of x subcarriers, wherein x is a positive integer.

9. The apparatus of claim 1, wherein the compensation circuit is to:
generate, for a first one of the subset of the plurality of subcarriers, a tone frequency;
determine, for the first one of the subset of the plurality of subcarriers, an image power of a transmitter for each of a plurality of candidate gain correction values and phase correction values;
identify, for the first one of the subset of the plurality of subcarriers, an optimum pair of the plurality of candidate gain correction values and phase correction values; and
store the optimum pair in a non-volatile memory in association with the first one of the subset of the plurality of subcarriers.

10. A method comprising:
performing, via a compensation circuit of a transmitter, a calibration of the transmitter to determine, for each of a plurality of subcarriers of a first polarity, first correction values, comprising, for a first subcarrier of the plurality of subcarriers of the first polarity:
generating a tone frequency;
processing the tone frequency with each of a plurality of candidate gain correction values and phase correction values;
determining an image power of the transmitter for the tone frequency processed with each of the plurality of candidate gain correction values and phase correction values;
identifying an optimum pair of the plurality of candidate gain correction values and phase correction values based at least in part on the image power; and
associating the optimum pair with the first subcarrier;
using the first correction values to determine second correction values for each of a plurality of subcarriers of a second polarity; and
storing the first correction values and the second correction values in a storage of the transmitter.

11. The method of claim 10, wherein the plurality of subcarriers of the first polarity comprises N or fewer subcarriers for a modulation scheme having 2N subcarriers.

12. The method of claim 10, further comprising:
receiving data in the compensation circuit; and
compensating the data for mismatch of the transmitter using the first correction values and the second correction values.

13. The method of claim 12, further comprising:
transforming the compensated data to time domain data;
converting the time domain data to a radio frequency (RF) signal; and
transmitting the RF signal from the transmitter.

14. The method of claim 10, further comprising storing the optimum pair in a first entry of the storage.

15. The method of claim 14, further comprising:
for a first subcarrier of a baseband signal, accessing the optimum pair from the first entry of the storage;
compensating the first subcarrier of the baseband signal using the optimum pair; and
providing the compensated first subcarrier of the baseband signal to a frequency-to-time converter to convert the compensated first subcarrier of the baseband signal to a time domain signal.

16. A system comprising:
a transceiver comprising a receiver and a transmitter, wherein the transmitter comprises a complex signal processing path comprising an in-phase (I) portion and a quadrature phase (Q) portion, and including:
a baseband circuit to generate at least a first subcarrier and a second subcarrier of a message sample;
a compensation circuit coupled to the baseband circuit, the compensation circuit to compensate for IQ mismatch, wherein the compensation circuit comprises:
a calibration circuit to determine a first gain correction value and a first phase correction value for a tone frequency associated with the first subcarrier; and
a correction circuit to apply the first gain correction value and the first phase correction value to the first subcarrier, and apply another gain correction value and another phase correction value to the second subcarrier, the another gain correction value obtained using the first gain correction value and the another phase correction value obtained using the first phase correction value;
a converter to convert the compensated first and second subcarriers to analog form;
a mixer coupled to the converter to convert the compensated first and second subcarriers in the analog form to a radio frequency (RF) signal; and
a power amplifier to amplify and output the RF signal; and a power detector coupled to the power amplifier to determine a carrier power and an image power of the RF signal.

17. The system of claim 16, wherein the correction circuit is to apply the first gain correction value and the first phase correction value to a first plurality of subcarriers, the transmitter comprising a multi-carrier IQ transmitter.

18. The system of claim 16, further comprising a non-volatile memory to store the first gain correction value and the first phase correction value.

* * * * *